United States Patent [19]

Barra

[11] Patent Number: 4,704,206
[45] Date of Patent: Nov. 3, 1987

[54] APPARATUS FOR CONTINUOUS FLOW FEED TO DISC-TYPE ROTARY FILTERS

[75] Inventor: Jean Barra, Gardanne, France

[73] Assignee: Aluminium Pechiney, Paris, France

[21] Appl. No.: 930,562

[22] Filed: Nov. 14, 1986

Related U.S. Application Data

[63] Continuation-in-part of Ser. No. 733,912, May 14, 1985, abandoned.

[30] Foreign Application Priority Data

May 14, 1984 [FR] France ................. 84 07830

[51] Int. Cl.$^4$ .................. B01D 33/26; B01D 33/38
[52] U.S. Cl. .................... 210/331; 210/405
[58] Field of Search .......... 210/327, 331, 334, 330, 210/343, 345, 346, 347, 391, 393, 405, 409, 418, 456, 486

[56] References Cited

U.S. PATENT DOCUMENTS 1,259,139 3/1918 Salisbury .................. 210/331
4,330,405 5/1982 Davis et al. ............... 210/331

FOREIGN PATENT DOCUMENTS 2817860 11/1979 Fed. Rep. of Germany ...... 210/331
579714 4/1983 U.S.S.R. .................. 210/402

Primary Examiner—Richard V. Fisher
Assistant Examiner—Linda S. Evans
Attorney, Agent, or Firm—Dennison, Meserole, Pollack & Scheiner

[57] ABSTRACT

An apparatus is disclosed for feeding a rotary filter with suspension by continuous flow to separate the solid and liquid phases of the suspension. The rotary filter apparatus includes at least one disc having filtering surfaces formed of a plurality of sectors fixed on a hollow horizontal driveshaft passing through the axis of the disc. The sectors are arranged to dip sequentially into a trough containing the suspension. The driveshaft serves for discharge of the liquid phase, and includes distributor means providing filtration, drainage and blowing stages acting sequentially on the sectors during the rotation of the discs. The apparatus for continuously feeding the suspension to the rotary filter includes (a) a suspension feed chamber provided with a suspension intake and two regulatable outlet openings; (b) two horizontal feed channels, each communicating with one of the outlet openings, each of the feed channels being disposed along a face of the disc opposite to the other feed channel, above the horizontal plane passing through the axis of rotation of the driveshaft, and extending horizontally no further than the axis of rotation; (c) each horizontal channel being formed by at least a side wall and a floor which is provided with means for regulating the distribution of the suspension over the corresponding surface of the disc by adjusting the distance between the floor and the corresponding face of the disc.

4 Claims, 11 Drawing Figures

APPARATUS FOR CONTINUOUS FLOW FEED TO DISC-TYPE ROTARY FILTERS

This is a continuation-in-part application of application Ser. No. 733,912, filed May 14, 1985, now abandoned.

BACKGROUND OF THE INVENTION

The invention concerns an apparatus for feeding a suspension of a solid phase in a liquid phase by a continuous or trickle flow to a disc-type rotary filter, which makes it possible for the beginning of the filtration step to be maintained at the maximum capacity of the filter which is controlled by the distributor for regulating the various steps for separation of the phases, comprising filtration, draining and removal of the solid matter.

It has long been known to effect separation, by filtration, of a continuous, liquid or gaseous phase and a dispersed, solid or liquid phase, initially forming a suspension which is produced for example by the operation of attacking an ore.

For that purpose, the suspension is taken over a carrier such as a grid, cloth, membrane, etc. on which the solid particles are deposited, forming a cake of varying thickness, while the liquid phase which constitutes the filtrate passes through the filtration cloth and is then collected by any collecting means.

Depending on the characteristics of the suspensions to be filtered such as for example the concentration of dry matter, the dimensions of the solid materials, suitability for separation, the corrosiveness of the medium, and the degree of classification required, the man skilled in the art is required to choose a suitable piece of equipment from the many different technologies which are available on the market.

Among the filtration processes which are disclosed in the specialist literature, one is very often used and appreciated in regard to separating the liquid and solid phases of suspensions which result from attacking ores using hydrometallurgical processes: the filtration process in question uses disc-type rotary filters such as those which are described for example in "Chemical Engineer's Handbook", page 19–79, by John H. Perry, edition No. 5, McGraw Hill Book Company, 1973.

As described therein, disc-type rotary filters comprise a plurality of discs which are fixed perpendicularly to a hollow horizontal shaft and which are formed by ducts in which various effects are produced such as a suction effect, a blowing effect and so forth. Each disc is formed by a plurality of independent sectors which are provided with wire gauze portions and/or textile filter bags, which are connected to the above-mentioned hollow horizontal shaft.

In the filtration operation, the discs bearing their sectors dip into a trough which contains the suspension to be filtered, the solid phase being caused to cling to the filter cloths by a suction effect while the separated liquid phase flows away in the collectors of the horizontal shaft which is provided with at least one distributor arrangement, by means of connections between each sector and the shaft itself. The solid phase which is disposed on the filter cloth is then drained when it passes into the free air and is then removed by blowing air in a counter-flow mode through the filtering surfaces.

Now, it is well known that a filtration process of that kind can no longer operate (to its full extent) once the lowest useful height of filling of the trough corresponds to insufficient immersion of the surface of a disc. That situation gives rise to a breakdown in the suction effect applied to the liquid phase through the filter medium of the sector, which jeopardizes separation of the two phases and which must be combated by quickly raising the level of the suspension in the trough.

Hence all the above-indicated disadvantages led the applicants to study and design an industrial apparatus for feeding disc-type rotary filters with a suspension, which makes it possible for the beginning of the filtration step to be maintained at the maximum capacity of the filter and to effect separation of the phases, filtration and draining, with a useful height in regard to filling of the trough, which is even lower than the lowest useful height in regard to filling of the trough.

SUMMARY OF THE INVENTION

According to the invention, the apparatus comprises means for feeding a rotary filter with suspension by a continuous or trickle flow, said suspension comprising solid and liquid phases to be separated by means of filtering surfaces formed by sectors, the array of which constitutes discs, said sectors being fixed to a hollow horizontal driveshaft which serves for discharge of the liquid phase and said sectors being in turn immersed in a trough containing the suspension, said shaft being provided with at least one distributor means for fixing the sequence of the filtration, draining and blowing steps in the course of the rotary movement, characterised in that, in order that, for each disc, the beginning of the filtration step is maintained at the maximum capacity of the filter, irrespective of the level of the suspension in the trough, the apparatus is provided, for each disc, with horizontal means for distributing the feed of suspension by continuous flow, said means comprising:

(a) two horizontal feed channels, each being disposed along a face of the disc, (b) each channel being at least formed by a side wall and a floor which is provided with means for regulating the distribution of the suspension over the corresponding surface of the disc, and (c) each channel being connected to the same suspension feed chamber from which the suspension is distributed over each face of the disc.

The two channels for feeding the suspension by a continuous trickle flow make it possible to produce a sheet of suspension in regularly distributed condition, in contact with the corresponding surface of the disc. The channels are preferably disposed above the horizontal plane which passes through the axis of rotation of the shaft, but it is possible for the channels to be disposed below that plane.

The means for regulating distribution of the suspension over the corresponding surface of the disc make it possible for example to adjust the space between the floor of the channel and the respective surface of the disc.

The suspension feed chamber which is often referred to as the "tank" and which is disposed at the head end of the channels makes it possible, by means of adjustments, to provide for uniform distribution of the suspension on respective sides of the disc before it is immersed in the suspension contained in the trough.

The invention will be better appreciated by reference to the numbered description of FIGS. 1 to 3 illustrating the invention.

DESCRIPTION OF THE PREFERRED EMBODIMENT

Figure 1:
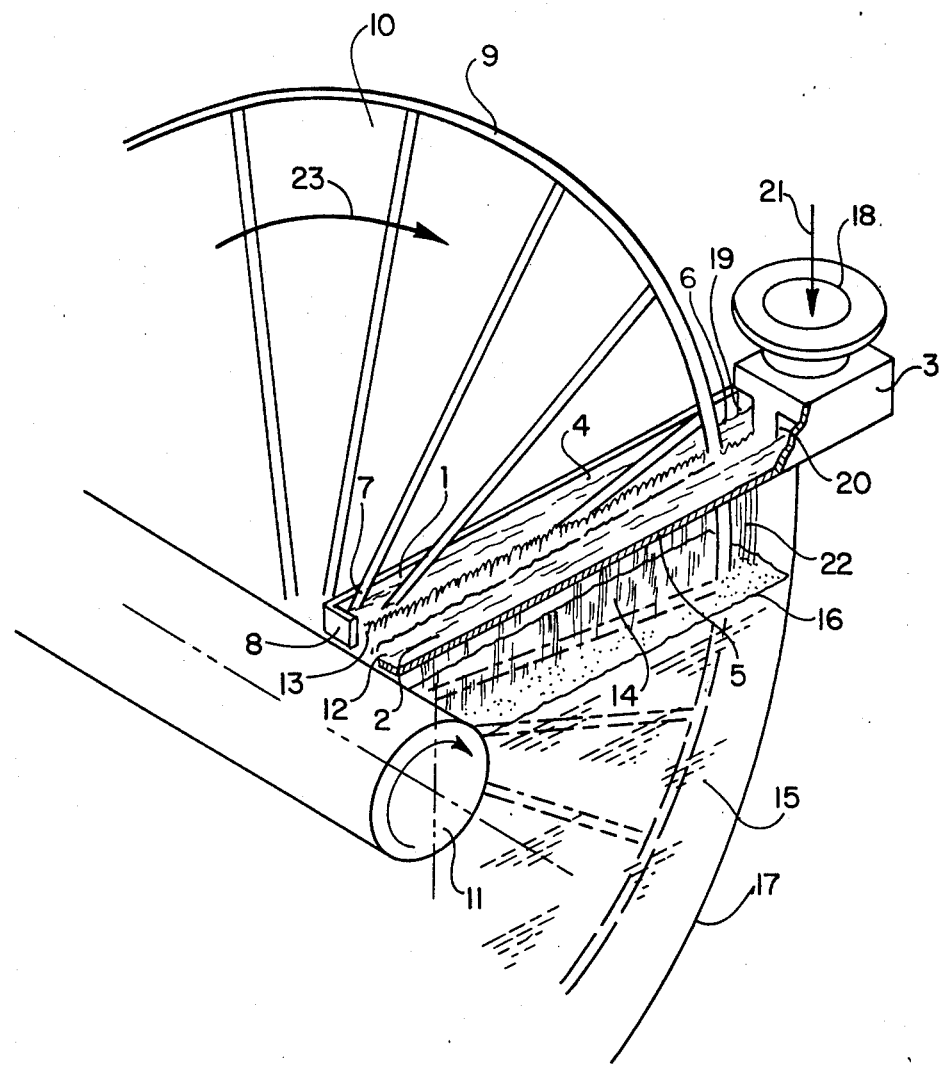
FIG. 1 shows a perspective view of part of the apparatus according to the invention for feeding and distributing the suspension to a rotary filter by a continuous flow.
Figure 1A:
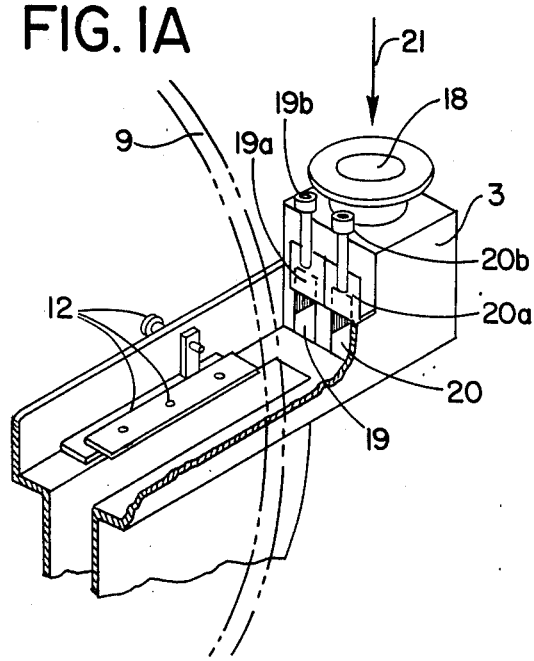
FIG. 1A is a fragmentary, perspective view of the feeding and distributing apparatus.

Referring to FIGS. 1 and 1A, the apparatus according to the invention for feeding a rotary filter by a continuous or trickle flow with a suspension of which the liquid and solid phases are to be separated is made up of two channels 1 and 2 and a feed tank 3 which is disposed at the head end of the two channels. Each channel comprises an internal side wall 4 and a bottom or floor 5, one of the ends 6 of which is sealingly fixed to the feed tank 3, while the other end 7 is closed by a partitioning wall 8. Each of the channels 1 and 2 which are disposed on respective sides of a disc 9 formed by the sectors 10 and driven by the hollow shaft 11 and which are provided with their floor 5 also has a means, generally 12, for regulating a space 13 between the floor 5 of the channel and the side surface of the disc 9, which permits the suspension to be distributed over a disc portion 14 which is involved in the filtration step by a continuous or trickle flow before it is immersed in the suspension 15, at the level indicated at 16 in trough 17.

For each disc 9, a feed chamber 3 for the supply of suspension to be filtered is disposed at the head end of the channels 1 and 2, at the end 6. The feed chamber 3 is provided with an intake 18 and two outlet openings 19 and 20, which respectively communicate with channels 1 and 2. The outlet openings 19, 20 are individually controllable by adjusting sliding shutters 19a and 20a, which move vertically and which are manually operated by two adjusting fillister head screws 19b and 20b. Thus, the flow opening and consequently, flow rate of suspension can be regulated in each channel according to each situation of use. In a particular example, openings 19 and 20 will have a width of 60 mm, and a height regulable between 50 and 200 mm by the shutters.

The suspension which is to be subjected to separation of its liquid and solid phases is introduced as indicated by the arrow 21 into the feed tank 3 and then issues therefrom by way of the openings 19 and 20 to feed the channels 1 and 2 which are disposed on respective sides of the disc 9. The suspension is then distributed over the two faces of the disc portion 14 which is involved in the filtration step by the continuous or trickle flow 22 while the disc rotates as indicated by arrow 23, well before the portion 14 of the disc is immersed in the suspension 15 contained in the trough 17. Thus, by means of the apparatus according to the invention, for each disc of a rotary filter, it becomes possible for the beginning of the filtration phase to be maintained at a constant height, irrespective of the level of suspension in the trough.

Figure 2A:
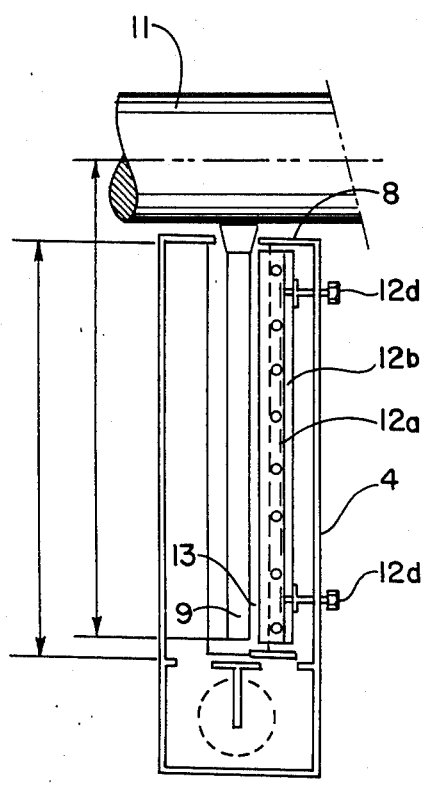
FIG. 2A is a top view of the channel showing the adjusting means in detail.
Figure 2B:
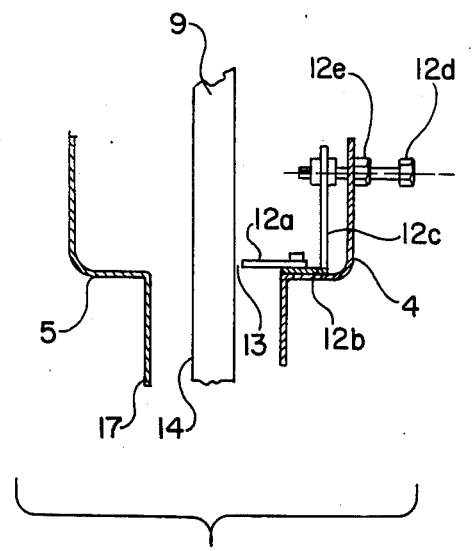
FIG. 2B is a detailed view in cross section of the adjusting means.
Figure 2:
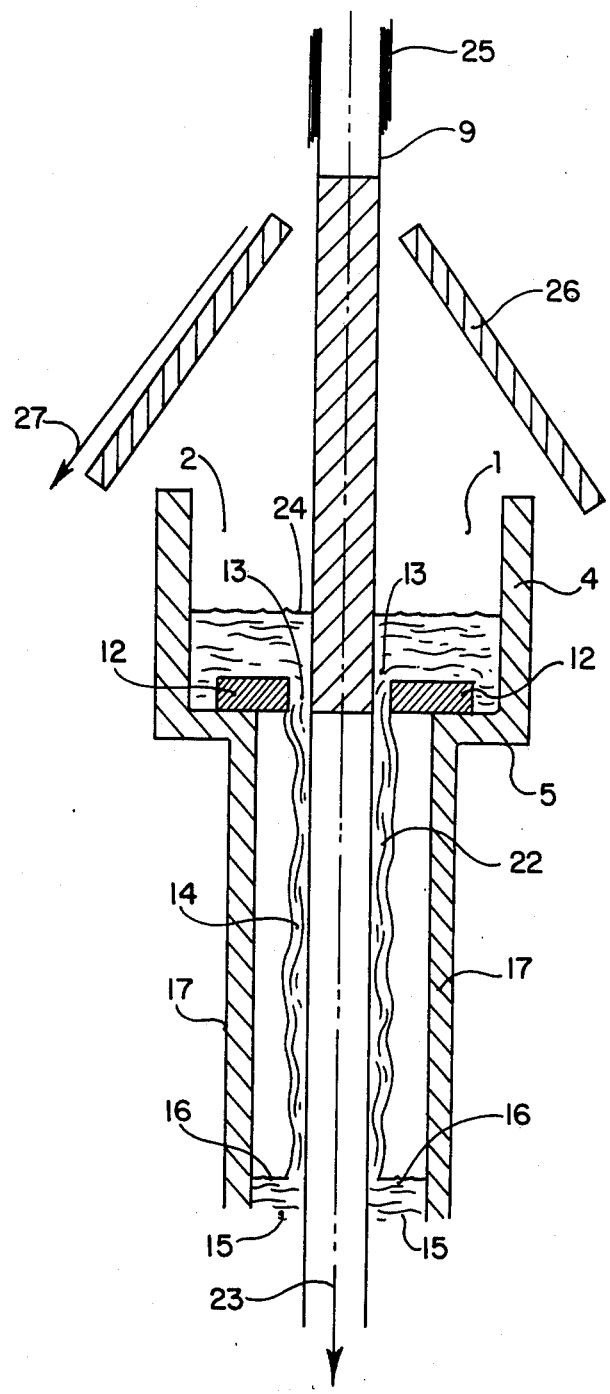
FIG. 2 shows a view of the channel in cross section.

Referring to FIG. 2, the apparatus according to the invention for feeding the faces of a rotary filter disc by a continuous or trickle flow comprises the channels 1 and 2 which are disposed on respective sides of the disc 9.

Each channel is formed by an external side wall 4, and a bottom or floor 5 disposed at the upper part of the trough 17.

The floors 5 of the channels 1 and 2 have a laterally adjustable block 12 for adjusting the gap 13 between the edges of the adjustable block 12 and the faces of the disc 9. The adjustable block 12 provides for distributing along the channels 1 and 2 the suspension 24 which flows away through the gap 13 in the form of a trickle-flow sheet of liquid 22 which is subjected to the filtration operation and which flows over the surface 14 of the disc over the entire length of the sector.

When the disc is driven in rotation in the direction indicated by the arrow 23 to provide for separation of the liquid and solid phases of the suspension, the solid phase which has formed the cake 25, having undergone the draining and blowing stages, is diverted by the deflectors 26 which are disposed above the channels 1 and 2, and passed outside the trough as indicated by the arrow 27.

FIGS. 1A, 2A and 2B show in detail a particular configuration for lateral adjustment of means 12 for regulating the space 13 between the floor 5 of the channel and the side surface of disc 9. The means 12 shown in the Figures comprises a weakly flexible strip 12a formed of metal or plastic which is screwed, riveted or otherwise attached onto the length of a rigid, rectangular plate 12b, formed of metal or plastic, so as to realize an overlap jointed assembly. Rectangular plate 12b extends longitudinally along the floor of the channel 5, and the plate is attached to an upwardly extending lug 12c. Two manually operable screws 12d pass through the side wall 4 and are fixed to the lugs 12c with nuts. The screws 12d are in threaded engagement with nuts 12e fixed to side wall 4, such that adjustment of screws 12d causes horizontal movement of the screws, lugs 12c, plates 12b and strips 12a, with plates 12b in sliding contact with the floor 5 of the channel. In this manner, there is lateral movement of plate 12b and strip 12a, and adjustment of the gap 13 thereby. Gap 13 is generally between 1 and 10 mm wide.

The various regulating mechanisms are operated together in order to obtain an even distribution of suspension 24 over disc surfaces 14 so as to form a trickle flow sheet of liquid 22 on the whole surface of the disc portion. Generally, the initial settings of the regulating mechanisms will be to maintain the regulable openings 19 and 20 at their maximum positions by proper adjustment of shutters 19a and 20a, so a maximum flow rate of suspension can be admitted to each channel. The initial gap 13 between the faces of the disc 9 and the strip 12a will be the minimum gap possible, generally about 1 mm.

Suspension 21 is then admitted to feed chamber 3 by intake 18 and flows from outlets 19 and 20. Because the openings are at their maximum while the gap is at its minimum, the stream of suspension into the channels 1 and 2 will be excessive, and will overflow the side wall 4 of the channel and the partitioning wall 8.

A first, coarse adjustment is then made by gradually lowering the sliding shutters 19a and 20a until the decreasing flow of suspension is then only slightly overflowing each channel. Then, the gap 13 is gradually increased until the equilibrium between the feed flow and the trickle flow is reached and the overflow of suspension is stopped. Generally, this coarse adjustment is not sufficient to obtain directly a trickle flow forming a continuous sheet of liquid 22 on the whole disc portion 14. A second, fine, step by step adjustment is then made by gradually raising the sliding shutters until the increasing flow of suspension is slightly overflowing channels 1 and 2 again. Likewise, gap 13 is gradually increased until the equilibrium between the feed flow and the trickle flow is reached again.

If a continuous sheet 22 of liquid is not yet achieved, a third adjustment is then made. The final gap will generally be between 1 and 10 mm whatever type of suspension is provided.

It is, of course, possible to use means other than sliding shutters to regulate the flow through outlet openings 19 and 20 and means other than 12a through 12e to regulate the gap 13. Any other suitable means for regulating the outlet openings and the gap can be utilized. Further, rather than purely manual adjustment of the openings and the gap, it is possible to utilize electrical motors to regulate the openings and the gap, or to utilize pneumatic controls, with such regulating means governed by the flowrate.

Figure 3:
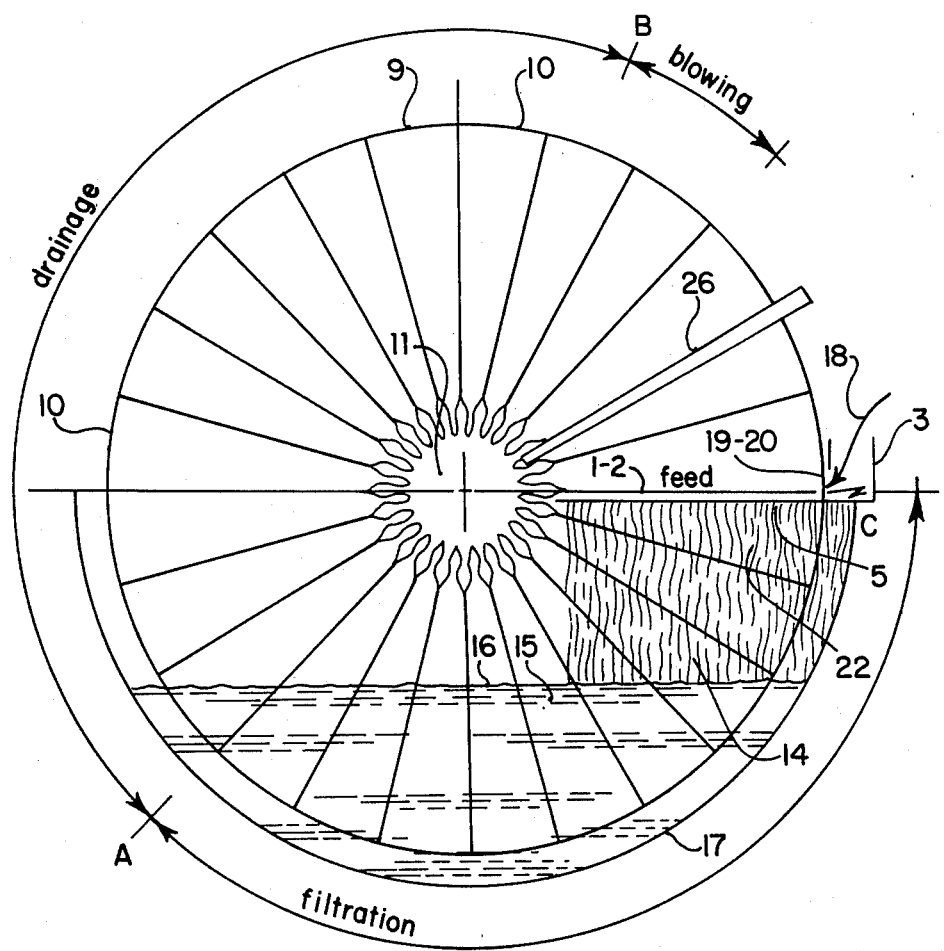
FIG. 3 shows a disc face provided with its channel, showing the effect at the beginning of the filtration step of maintaining a constant height irrespective of the level of the suspension in the trough.

Referring to FIG. 3, the rotary filter is formed by filter discs 9 which are provided with filtering sectors 10 of trapezoidal shape, connected to the hollow horizontal driveshaft 11. The disc 9 is disposed vertically in the trough 17 containing the suspension 15 to be filtered.

When the filter is in operation, the filtering sector passes from the drainage position A to the blowing position B and then to position C for the commencement of filtration by separation of the liquid and solid phases of the suspension, by virtue of the feed thereto of suspension by a continuous flow by means of the apparatus according to the invention, even before the sector concerned is immersed in the suspension 15 contained in the trough 17.

The disc portion 14 is fed (over each face thereof) by the continuous trickle flow 22 of the suspension to be filtered, and perform its function of separating the solid and liquid phases by filtration well before the sector is (partially or totally) immersed in the trough 17 containing the suspension 15 to be filtered.

By referring to FIG. 3, it is possible to verify that, by means of the apparatus according to the invention, for each disc of the rotary filter, it is possible to maintain the beginning of the filtration phase at a constant height irrespective of the level 16 of suspension in the trough 17, whereas in the prior art, the filtration operation can be carried out only when the whole of the sector 10 is immersed in the suspension 15 contained in the trough 17.

Figure 3A:
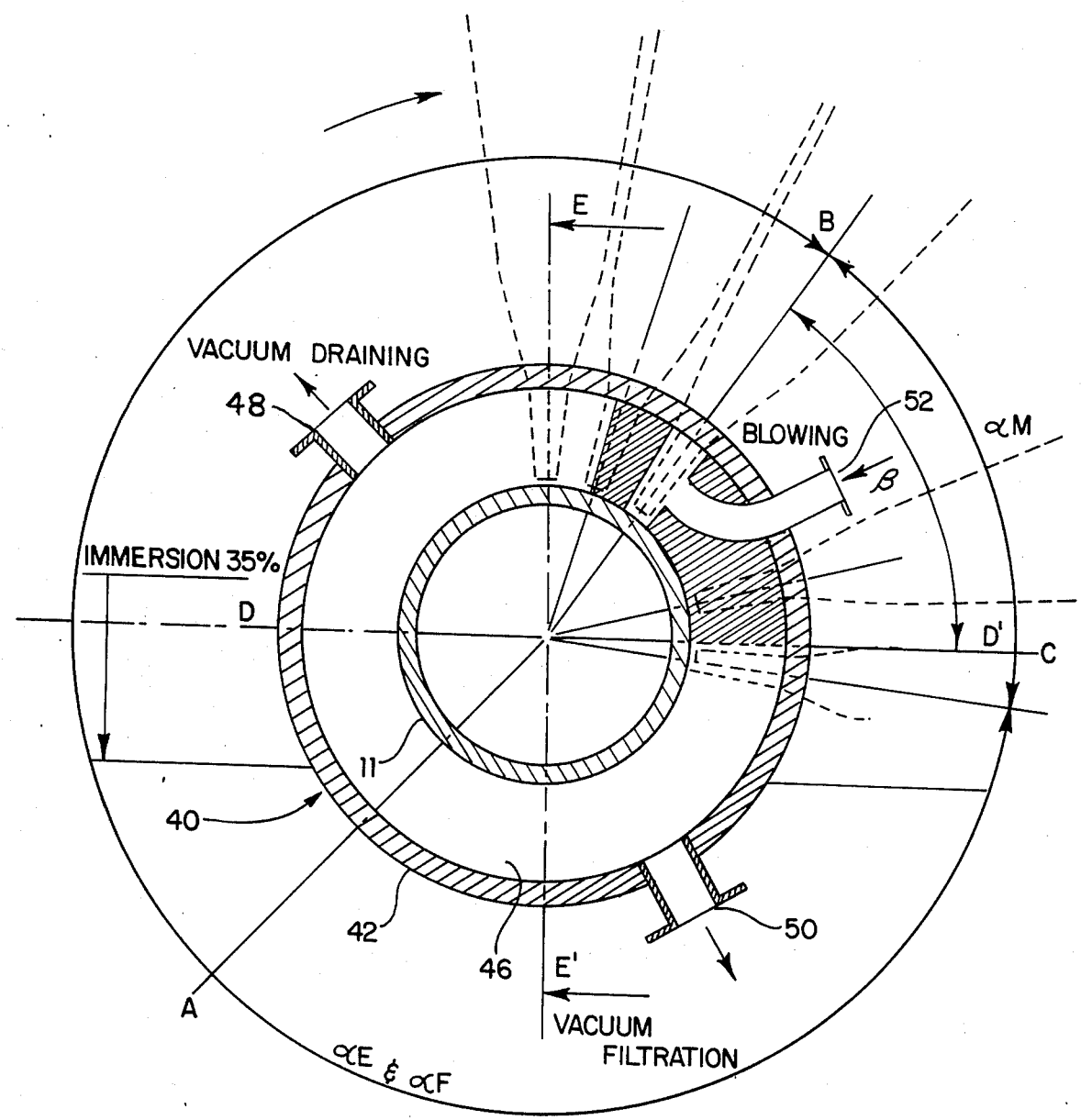
FIG. 3A is a radial, cross section of a stationary distributor extending rotary shaft showing the sequence of filtration, drainage and blowing steps.

FIG. 3A shows in cross section the fixed distributor means 40 for accomplishing the blowing, filtration and draining steps. The distributor means 40 includes an outer wall 42, which surrounds the rotary shaft 11 defining therebetween a space 46 over part of their circumferences. A vacuum outlet 48 is provided for vacuum draining of the filter disc passing drainage position A and a vacuum outlet 50 is provided for filtration of sectors of the filter disc passing filtration position C. An air inlet 52 is provided for blowing of particulate from the disc as it passes blowing position B. The fixed distributor means provides for isolation of the vacuum sections from the blowing section.

Figure 3B:
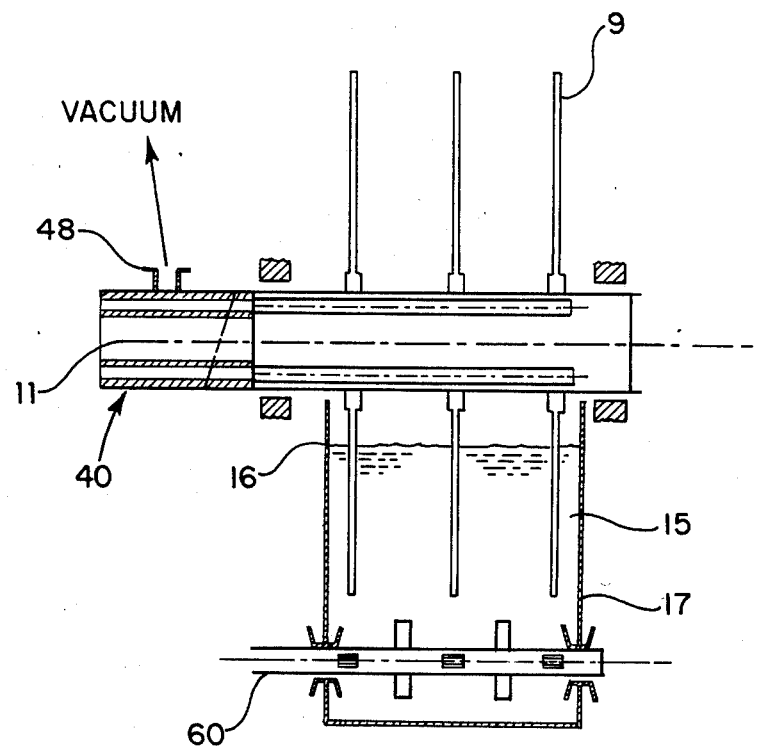
FIG. 3B is a cross section along line EE' of FIG. 3A, FIGS. 4 and 5 are schematic views of a disc face according to the prior art.

Also shown in FIG. 3B is a rotary stirrer 60 located at the bottom of trough 17.

Figure 4:
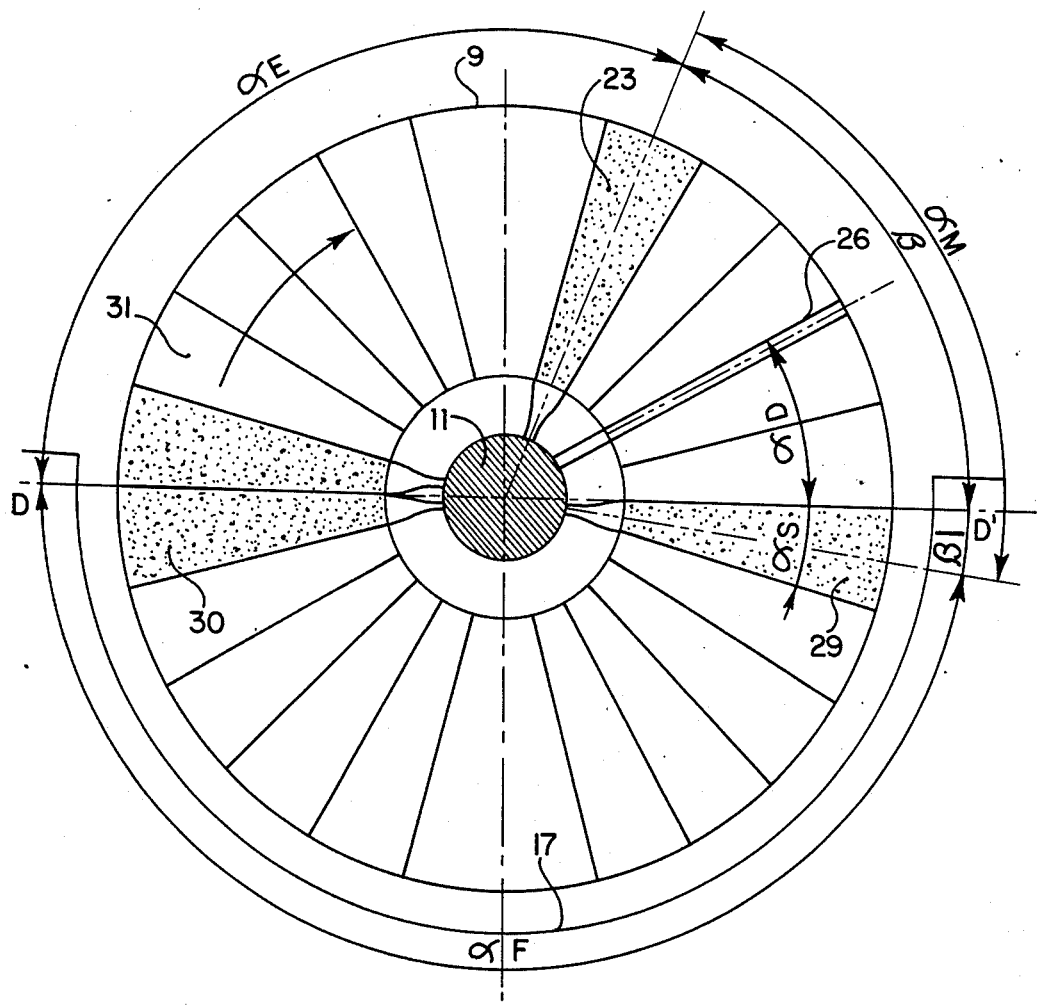
Figure 5:
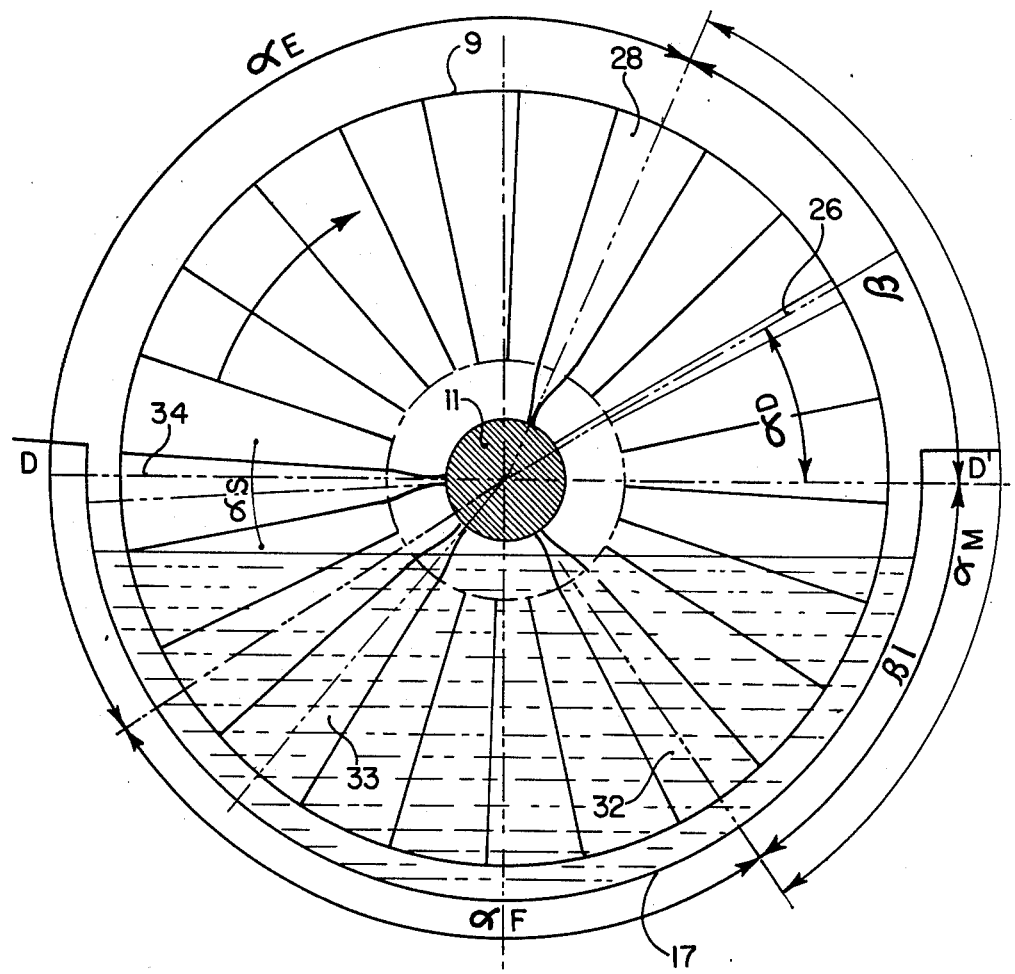
Figure 6:
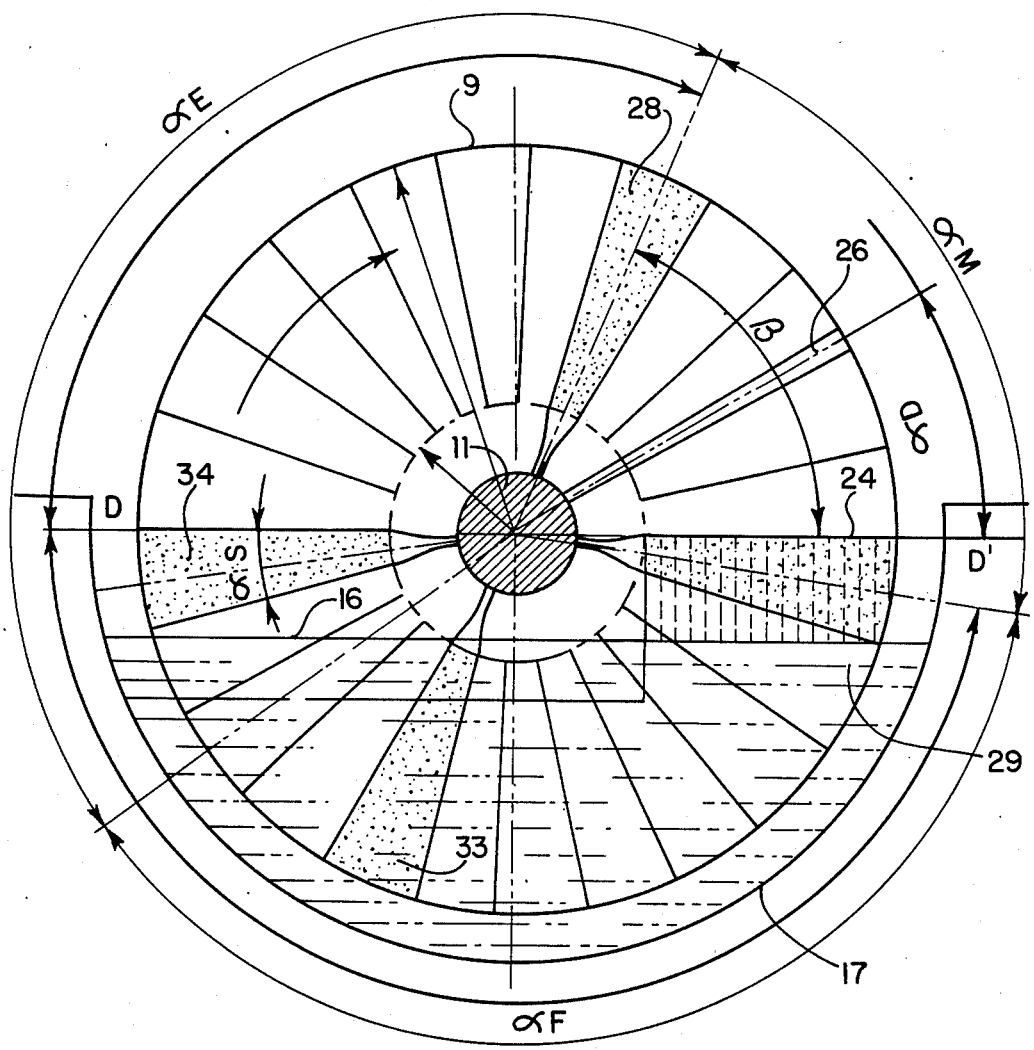
FIG. 6 is a schematic view of a disc face according to the invention.

EXAMPLE (As shown in FIGS. 4, 5 and 6)

The subject-matter of the invention was studied and compared before (prior art) and after modification (invention) of a disc-type rotary filter comprising: a trough 17 having a capacity of 30 m$^3$, a cylindrical driveshaft 11 with a diameter of 0.6 meter and comprising seven discs 9 with a diameter of 3.9 meters, providing for separation of the liquid and solid phases of an aqueous suspension of $Al(OH)_3$, with a concentration of dry matter of 0.25 tonne per cubic meter. The suspension flow on each disc is about 70 to 110 m$^3$/hour, so the flow through each regulable opening and gap is about 35 to 55 m$^3$/hour. The flowrate is reduced when the solid fraction of the suspension increases.

The discharge of the cake 25 is achieved by the two inclined deflectors 26 defining an angle $\alpha_D$ with horizontal axis DD', and positioned on each face of the disc above the horizontal channels 1,2.

Each filtering disc 9 comprises 24 sectors each representing an angle $\alpha_S$ of about 15° over the surface of the disc, being defined by the radial edges of the sector, $\alpha_S$ being defined by the relationship 360°/N wherein N is the number of sectors forming the disc.

The filtering support of each sector gives the disc a filtering surface area which is defined by an external radius R equal to 2.0 meters and an internal radius of 0.5 meter.

In the three Figures of drawings (4, 5 and 6), the position 28 of the sector at the beginning of the blowing operation was fixed at an angle $\beta$ of 60° with respect to the horizontal line DD', upstream of the filtration step.

As shown in FIGS. 4 and 5 which illustrate the prior art, the driveshaft 11 is immersed in the suspension to be filtered to a proportion of 50% (FIG. 4) and 35% (FIG. 5) of its surface area.

As shown in FIG. 4, the above-mentioned position 28 and the position 29 corresponding to total immersion of the sector, that is to say, corresponding to the beginning of the filtration step, when the sector forms an angle $\beta_I$ to the line DD', define an inactive angle $\alpha_M$ which is equal to $(\beta + \beta_I)$.

The filtration step begins at position 29 when the sector is completely immersed and is concluded when the sector is in an intermediate position between position 30 at the time at which the sector begins to emerge and a position 31 at which the sector has emerged completely. That mean position and the position 29 define a filtration angle $\alpha_F$ which also depends on immersion and the angle $\alpha_S$ of the sector, $\alpha_F$ being equal in that case to $(180° - \alpha_S/2)$.

The drainage step begins at the mean position, between positions 30 and 31, that is to say, at the end of the filtration phase, and is completed when the sector is in position 28 (commencement of the blowing operation), those two positions thus defining a drainage angle $\alpha_E$ of $(360° - \alpha_F - \alpha_M)$.

Thus, the various angles referred to above are of the following values:

$$\alpha_M = \beta + \beta_I = 67.5°$$

$$\alpha_F = 180° - \beta_I = 172.5°$$

$$\alpha_E = 360° - \alpha_F - \alpha_M = 120°$$

Referring to FIG. 5, the above-mentioned position 28 and the position 32 corresponding to total immersion of the sector, that is to say, corresponding to the beginning of the filtration step, define an inactive angle $\alpha_M$ which is equal to $(\beta + \beta_I)$, $\beta_I$ being the angle defined by the horizontal line DD' and the position 32 of the sector when it is totally immersed.

The filtration step begins when the sector is in the complete immersion position 32 and is completed in an intermediate position between position 33 at the time at which the sector begins to emerge and position 34 at which the sector has emerged completely. The intermediate position and the position 32 define the filtration angle $\alpha_F$ which also depends on the immersion and the angle $\alpha_S$ of the sector.

The drainage step begins at the intermediate position between positions 33 and 34, that is to say, at the end of the filtration operation, and is completed when the sector is in position 28 (beginning of blowing), those two positions thus defining a drainage angle $\alpha_E$ equal to $(360° - \alpha_F - \alpha_M)$.

Thus, those various angles are of the following values:

$$\alpha_M = \beta + \beta_I = 120°$$

$$\alpha_F = 148° - \beta_I = 88°$$

$$\alpha_E = 360° - \alpha_F - \alpha_M = 152°$$

Referring to FIG. 6 which illustrates the subject of the invention, the continuous flow feed apparatus takes effect only if the level 16 of the suspension in the trough 17 is below the level 24 of the feed of suspension by way of the channels 1 and 2 (see FIGS. 1 and 2). The level 16 corresponds to a degree of immersion of 35% of the disc, as in the situation shown in FIG. 5.

In the situation shown in FIG. 6, the feed apparatus according to the invention is positioned in such a way that the feed level 24 is disposed at the level of the line DD'. Hence, the filtration step begins when the sector is in the position 29 fixing the angle $\alpha_M$ which is equal to $(\beta + \beta_I)$.

The filtration step begins when the sector reaches the position 29 in which it is completely involved in the continuous trickle flow according to the invention. The filtration step is completed in an intermediate position between the position 33 at the time at which the sector begins to emerge and the position 34 at the time at which the sector has completely emerged. The intermediate position and the position 29 define the filtration angle $\alpha_F$ which also depends on immersion and the angle $\alpha_S$ of the sector.

In the case of the invention, the level 16 of the suspension in the trough, that is to say, the level of immersion of the disc, influences the end of the filtration step, being the position between positions 33 and 34, but has no influence on the beginning of the filtration step, that is to say, on position 29, when it is involved in the continuous trickle flow.

Thus, irrespective of the magnitude of immersion, the angle $\alpha_M$ is constant and accordingly the sum of the productive angles $\alpha_F$ and $\alpha_E$ remains constant whereas in the prior art (FIGS. 4 and 5), the angle $\alpha_M$ and the sum of the angles $\alpha_F$ and $\alpha_E$ vary depending on the magnitude of disc immersion.

Thus, according to the invention, the various angles are of the following values:

$$\alpha_M = \alpha + \beta_I = 67.5°$$

$$\alpha_F = 148° - 7.5° = 140.5°$$

$$\alpha_E = 360° - \alpha_F - \alpha_M = 152°$$

In the particular case according to the invention where the level 16 in the trough 17 reaches the feed level 24 of the channels 1 and 2 of the apparatus according to the invention, the effect of the flow over the disc is neutralized by virtue of the immersion effect, and the situation corresponds to that shown in FIG. 4, giving rise, in regard to the angles $\alpha_M$, $\alpha_F$ and $\alpha_E$, to a condition of equality with those shown in FIG. 4.

For a degree of immersion of less than 35%, when the sector portion which is disposed close to the shaft is no longer immersed, that is to say, passing above the level of the suspension in the trough, the non-immersed portion does not give rise to a breakdown in the vacuum effect, as in the prior art, as that portion was coated with solid phase when it passed through the continuous flow region which is between the level of the suspension in the trough and the level of the feed at 24.

All the values of the angles $\alpha_M$, $\alpha_F$ and $\alpha_E$ and the sum thereof, $\alpha_F + \alpha_E$, are set forth in the following Table to permit a comparison to be made between the prior art and the subject of the invention.

TABLE I

| Angles | Prior art | Invention |
|---|---|---|
| | FIG. 4 | 50% immersion |
| | 50% immersion | of the driveshaft |
| | of the driveshaft | equivalent to FIG. 4 |
| $\alpha_M$ | 67.5° | 67.5° |
| $\alpha_F$ | 172.5° | 172.5° |
| $\alpha_E$ | 120° | 120° |
| $\alpha_F + \alpha_E$ | 292.5° | 292.5° |
| | FIG. 5 | FIG. 6 |
| | 35% immersion | 35% immersion |
| | of the driveshaft | of the driveshaft |
| $\alpha_M$ | 120° | 67.5° |
| $\alpha_F$ | 88° | 140.5° |
| $\alpha_E$ | 152° | 152° |
| $\alpha_{F+E}$ | 240° | 292.5° |

Thus, the foregoing Table shows that:

in the case of the prior art, it is found that the angles $\alpha_F$ and $\alpha_E$ vary according to the degree of immersion, which is well known, whereas the angle $\alpha_M$ increases consequentially when the level of suspension in the trough falls, giving rise to a reduction in the productivity of the filter since the sum $(\alpha_F + \alpha_E)$ falls simultaneously with the reduction in the degree of immersion;

in the case of the invention, the angle $\alpha_M$ is constant irrespective of the level of suspension in the trough while the angles $\alpha_F$ and $\alpha_E$ vary in accordance with that level, as in the prior art, while retaining in respect of the sum $(\alpha_F + \alpha_E)$ a value which is at least equal to that of the prior art when the degree of immersion is at a maximum (that is to say 50%). The sum $(\alpha_F + \alpha_E)$ remains at a maximum when the level of immersion is less than 50% and remains constant in the case of the invention whereas it decreases simultaneously with the degree of immersion in the case of the prior art.

As already stated above, an accidental drop in level in the trough of the filter below a limit which is fixed by the filtering portion of the sector, in the case of the prior art, gives rise to a breakdown in the vacuum because the filtering region of the sector which is close to the shaft is no longer immersed, whereas in the invention, an accidental drop in level in the trough, to the same degree, does not cause the vacuum to be broken since the nonimmersed filtering region of the sector has been previously covered by the solid phase at the time at which the sector was passing through the continuous flow region.

It follows from the above-indicated particularity that it is possible voluntarily to vary the level of the suspension in the trough in order to vary the angles $\alpha_F$ and $\alpha_E$ without having to take action on the distributor means of the filter, whereas such action is essential in the case of the prior art, by simultaneously causing a variation in the angle $\alpha_M$.

What is claimed is:

1. In a rotary filter apparatus for separating the solid and liquid phases of a suspension, said rotary filter apparatus including at least one disc having filtering surfaces formed of a plurality of sectors fixed on a hollow horizontal driveshaft passing through the axis of said at least one disc, which driveshaft serves for discharge of the liquid phase, said sectors arranged to dip sequentially into a trough containing the suspension, said driveshaft including distributor means providing filtration, drainage and blowing stages acting sequentially on the sectors during rotation of each said disc, the improvement comprising an apparatus for continuously feeding suspension to the rotary filter apparatus, and comprising:

(a) a suspension feed chamber including a suspension intake means, means defining outlet openings, and means for regulating the flow rate of suspension in each said outlet opening;

(b) two horizontal feed channels, each communicating with one of said outlet openings, each of said feed channels being disposed along a face of the disc opposite to the other feed channel, above the horizontal plane passing through the axis of rotation of the driveshaft, and extending horizontally no further than said axis of rotation;

(c) each said horizontal channel being formed by at least a side wall and a floor including means for regulating the distribution of the suspension over the corresponding surface of the disc by adjusting the distance between said floor and the corresponding face of the disc.

2. Apparatus according to claim 1, additionally comprising deflectors for discharge of the solid phase positioned above said feed channels.

3. Apparatus according to claim 1, wherein said means for regulating the distribution comprises a laterally adjustable block means which is slidable on the floor of said horizontal channel.

4. Apparatus according to claim 1, wherein said means for regulating the flow rate of suspension in said outlet openings comprise sliding shutters.

* * * * *